Jan. 30, 1945.                C. P. BEDFORD                2,368,442
                           METHOD OF SHIPBUILDING
              Original Filed March 21, 1942    4 Sheets-Sheet 1
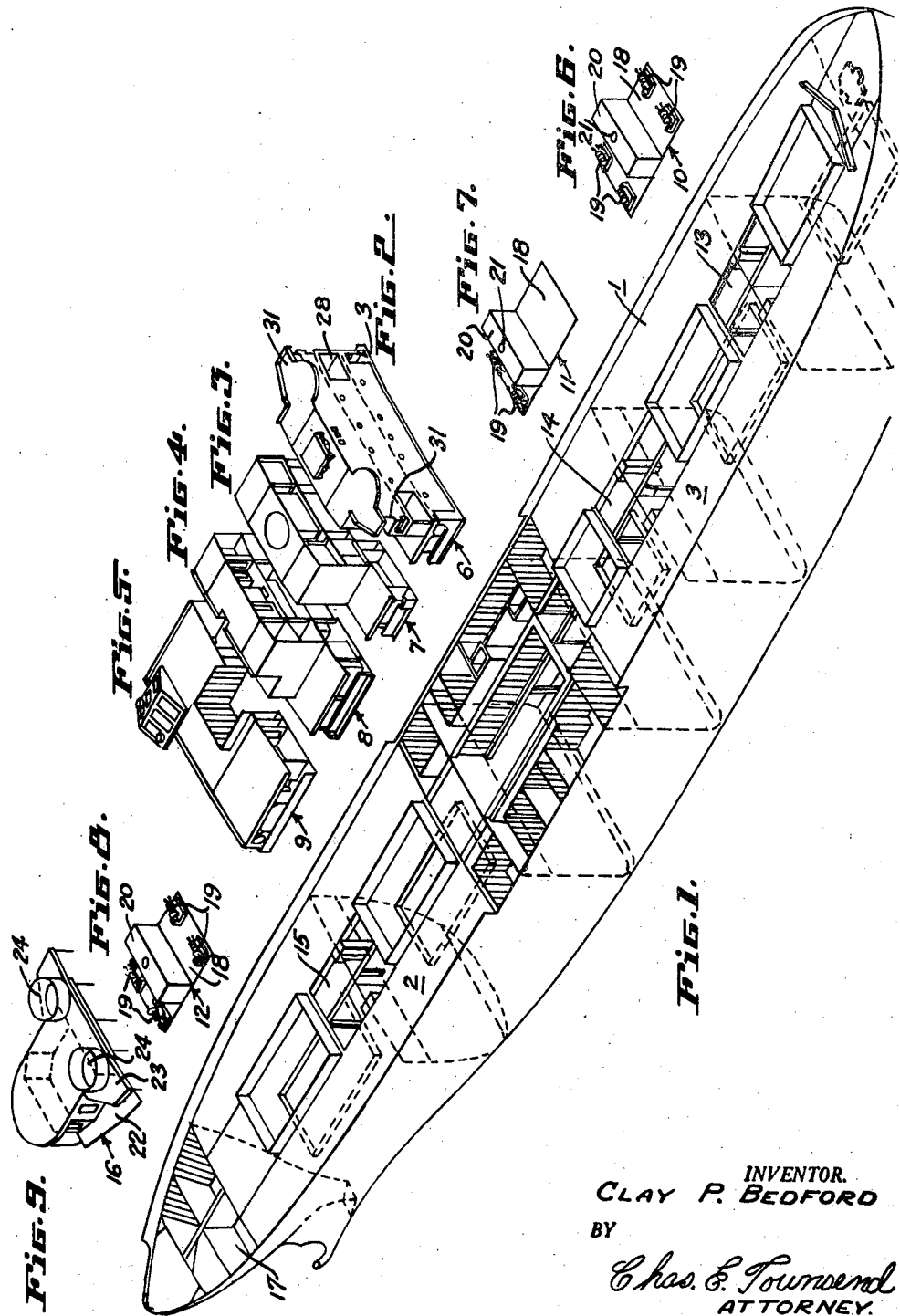
INVENTOR.
CLAY P. BEDFORD
BY
Chas. E. Townsend
ATTORNEY.

Jan. 30, 1945.　　　C. P. BEDFORD　　　2,368,442
METHOD OF SHIPBUILDING
Original Filed March 21, 1942　　4 Sheets-Sheet 3
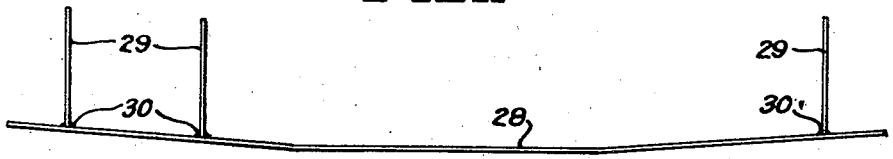
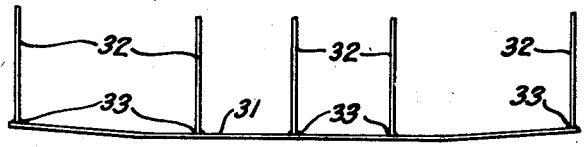
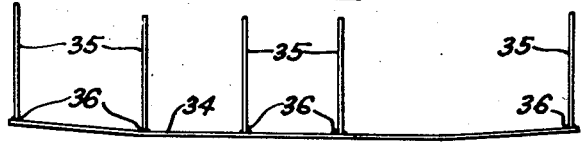
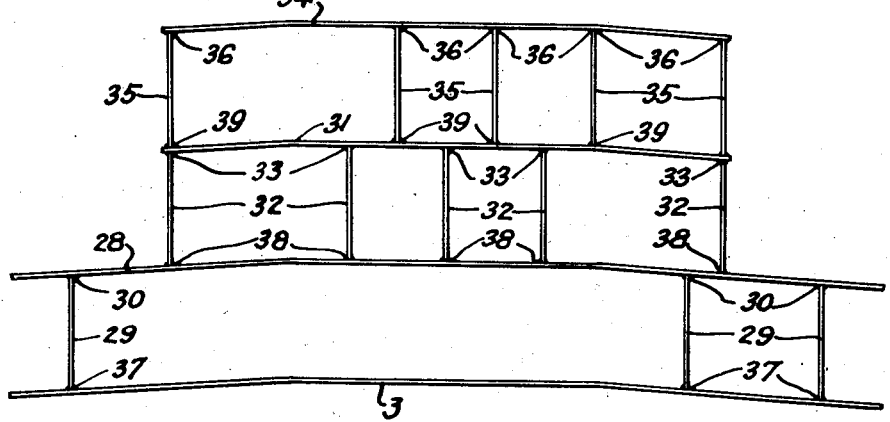
INVENTOR.
CLAY P. BEDFORD
BY
Chas. E. Townsend
ATTORNEY Jan. 30, 1945. C. P. BEDFORD 2,368,442
METHOD OF SHIPBUILDING
Original Filed March 21, 1942 4 Sheets-Sheet 4

INVENTOR.
CLAY P. BEDFORD
BY
Chas. E. Townsend
ATTORNEY.

Patented Jan. 30, 1945

2,368,442

UNITED STATES PATENT OFFICE 2,368,442

METHOD OF SHIPBUILDING

Clay P. Bedford, Berkeley, Calif.

Application April 29, 1943, Serial No. 485,075, which is a continuation of application Serial No. 435,656, March 21, 1942. Divided and this application June 15, 1944, Serial No. 540,462

5 Claims. (Cl. 114—79)

This invention relates to shipbuilding and pertains particularly to a method and means of economizing and conserving time and labor in the prefabrication of steel ships in mass production.

This application is a division of my original application Serial Number 435,656, filed March 21, 1942, for "Method of shipbuilding" and in continuation of my divisional application Serial Number 485,075, filed April 29, 1943, now abandoned.

Heretofore, as far as known, it has been the universal practice in shipbuilding, first to erect the hull, together with appropriate braces, reinforcements and supports, and then, after launching, to equip the vessel with its various structures of a midships deckhouse, after deckhouse and mast houses, thereby consuming many weeks and months of additional time in the finishing and equipment of the vessel. Under present demands for mass production of cargo type vessels, it is desirable to cut down as much as possible on the length of time between the laying down of the keel and the placing of the finished ship in commission.

Steel ships are now being built of steel plates, beams and, perhaps, other forms, in a manner involving the joining of the plates to each other, and, perhaps, other parts thereto, by welding. The welding of bulkheads to an overhead deck is more difficult than welding with the line of juncture below the eyes and hands of the workman. The present invention has particularly to do with the discovery of a method by which practically all welding of such massive cellular structures, such as deck houses and the like, may be effected by what is known as down-hand welding. This method avoids overhead welding and permits the welder to do practically all his welding below.

In the original application, of which this is a division, the invention, broadly stated, comprises the pre-assembly of pre-erection or pre-construction of rather large and heavy sections or parts of deck superstructure housings, supplying such sections, where needed, with suitable temporary struts, braces or other reinforcing or supporting means so that the large and heavy sections will be structurally sound and may be suspended and lifted by cranes into place on the ways or on the partially constructed ship without substantial deformation of the lifted sections and without the occurrence of undue stresses or strains therein, and then welding the pre-assembled sections together.

Another feature of that invention is the arrangement of the dividing lines between adjacent sections to make permanent parts of the sections provide the necessary supports in order to minimize the necessity for temporary supports, and to minimize the joining or connection of pipes, conduits, decks and bulkheads, especially if insulated, and other parts. The arrangement of the dividing lines between sections is also such that all parts on which work is to be done will be easily accessible to the workmen, such as the shipfitters, plumbers, pipefitters, electricians, those working on specialty subcontracts, deck coverings, and the like, the joiners or woodworkers, the painters, the finishers, and the like, including those who construct or locate built-in furniture; and, finally, those who inspect and check the work done.

One of the serious problems, however, in such an undertaking, is the fact that these superstructures, being of steel and usually consisting of a plurality of decks, are not only cumbersome but may weigh upwards of seventy-five tons.

The present invention involves a plan by which a structure, as a deckhouse, can properly and advantageously be built as self-containing sections, wherein each section may be treated and handled as a separate unit through the various stages of erection of the unit section and on through to its final equipment and finish, including all of the above-mentioned operations. These various steps are performed progressively in various stages in the plant. After completion and after the vessel is ready to receive these superstructures, the sections are moved finally into position on the ship; the sections then being united and assembled into the completed deckhouses so that they become permanently united into an integral part of the ship. After final installation they are as indistinguishable as to permanence, strength, rigidity and sea worthiness as though the structure had been built piece by piece in situ into the ship in the customary manner.

Having described the invention in general terms, it will now be described more in detail, and, as a specific example, as applied to the mass production of the United States Maritime Commission EC 2-S-C1 type cargo vessels.

Referring to the drawings which form a part of this specification:

Figs. 1–9 represent an exploded perspective view of a ship without the masts.

Fig. 1 is a perspective view of the hull.

Fig. 2 is a perspective view of the forward section of the deckhouse.

Fig. 3 is a similar view of the next section thereof.

Fig. 4 is a similar view of the next section thereof.

Fig. 5 is a similar view of the after section thereof.

Figs. 6, 7 and 8 are similar views of the masthouses and appurtenant winches.

Fig. 9 is a similar view of the after deckhouse.

Figs. 11, 12 and 13 are more or less schematic type views, illustrating the construction of the deckhouse sections and the manner of downhand welding.

Fig. 14 is a similar view, showing decks of the deckhouse sections in assembled relation.

Figure 10:
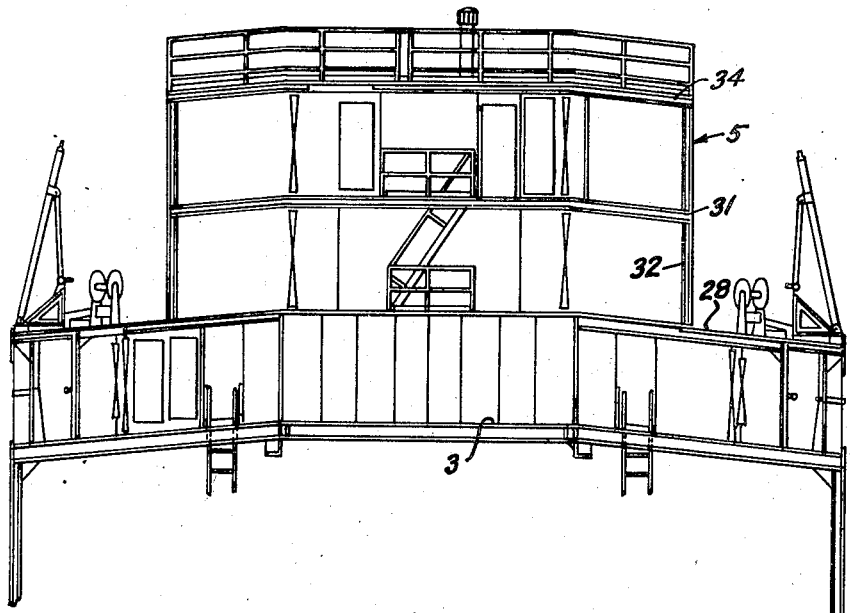
Fig. 10 is a more or less schematic type sectional view of the completed deckhouse with appurtenant parts, looking aft.

The completed hull is shown as 1, and within it is the so-called second deck 2. The upper deck 3 is above the second deck and forms the ceiling for the rooms, compartments, and passageways for which the second deck constitutes the floor. The deckhouse 5 (Fig. 10) is on the upper deck and is formed of the sections 6, 7, 8 and 9 (Figs. 2–5). The mast houses 10, 11 and 12 (Figs. 6, 7 and 8) are also on the upper deck; and they are over and cover the deck openings 13, 14 and 15. The after deckhouse 16 is on the same level and over the deck opening 17. The hull, decks, deckhouses and mast houses are formed of steel plates welded together. The mast house assemblies comprise each a steel plate deck section 18 on which are fixed the winches 19 and a housing member 20, each of which has an opening 21 at the top therethrough to accommodate the respective mast. The after deckhouse comprises a deck section 22, above which is an elevated deck 23 provided with suitable protection walls 24 for machine guns and gunners. The mast houses and after deckhouse are assembled complete and then placed in the proper positions on the upper deck to which the respectively deck sections 18 and 22 are welded.

The mast house and after deckhouse are each of such size and weight that they can be lifted by means of cranes and placed in proper position on the ship. In at least one shipyard where the United States Maritime Commission EC 2-S-C1 cargo vessels are being built, cranes are available which have a capacity of about seventy-five tons and which are capable of lifting and suspending the mast houses and the after deckhouse in complete units. The complete midships deckhouse, however, is of a weight which far exceeds the capacity of such cranes, the weight being such that it becomes necessary to divide it into at least four sections so that it can be lifted and moved by such cranes. While cranes could no doubt be built capable of handling the completed midships deckhouse as a unit, yet it is often desirable to build a unit in separate sections in order to afford easy access to materials needed for, and to, men working on the installation of fittings and furnishings, since the division into sections opens up passageways through which the men and materials must pass, which may otherwise be too narrow or constricted for free movement therethrough. For mass production, the deckhouse sections 6, 7, 8 and 9 are built as completely as is possible, and pre-assembled with bolt connections for aligning.

The manufacturing procedure, after the steel plates are received and unloaded, is to place them in plate storage racks for use as needed, or to use them immediately, as the case may be. The plates are laid out on a platform, suitable templates placed thereon, and marks made on the plates according to the templates. The plates are then burned or cut along the marked lines and subjected to whatever manufacturing steps may be required, such as rolling, punching, shearing, bending, and the like. Further procedure will be understood by referring to Figs. 11 to 14 in conjunction with Figs. 2 to 5.

The next procedure is the assembly of the plates into various complete mast houses, after deckhouse, and sections of the midships deckhouse. The boat deck 28 is next above the upper deck 3. Bulkheads 29 run from the upper deck to the underside of the boat deck above, and they are welded to the boat deck 28 by placing the boat deck upside-down with the bulkheads 29 supported to project upwardly therefrom (Fig. 11), welds being applied at 30. The bridge deck 31 is next above the boat deck and constitutes the ceiling for any rooms, compartments or passageways between the two. Bulkheads 32 between the two are attached by turning the bridge deck upside-down, and supporting the bulkheads 32 to project upwardly therefrom, whereupon they are welded at 33 (Fig. 12). The house top 34 is next above the bridge deck and forms the ceiling for any rooms, compartments or passageways therebetween. The bulkheads 35, forming the compartments between the house top and the bridge deck, are similarly attached to the house top while it is upside-down (Fig. 13), and welded thereto at 36. A great advantage results from assembling the bulkheads with the decks in upside-down position, because this permits of a downhand rather than an overhead welding operation.

The assembly illustrated on Fig. 11 is then placed rightside up on the upper deck 3 and welded thereto at 37, this welding operation being likewise a downhand, rather than an overhead, operation. The assembly illustrated on Fig. 12 is then placed rightside up on the boat deck 28 and welded thereto at 38; and the assembly illustrated on Fig. 13 is placed rightside up on the bridge deck 39 and welded thereto at 39. The upside-down assembly, by welding of the bulkheads to the deck and thereafter attaching them by welding to the deck below in rightside up position, eliminates the otherwise necessary overhead welding which requires more skill and time than ordinary or downhand welding.

After the steel parts have been welded, as just described, into the deckhouse sections, such sections are furnished and finished to the fullest extent possible.

As prefabrication is completed, the separate sections are unbolted and transferred in successive order to the hull, where they are again erected in sequence and rebolted prior to final welding at the points of cleavage. As many as desired of each complete deckhouse section can be built to provide what is the equivalent of mass line production.

Figure 15:
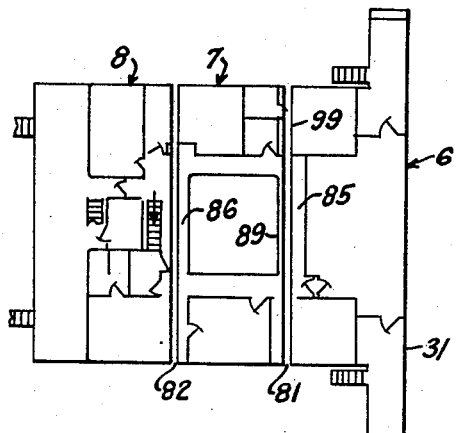
Fig. 15 is a plan view, showing the arrangement of rooms, passageways and other spaces on the bridge deck level of the midships deckhouse, the deckhouse being in sections.
Figure 16:
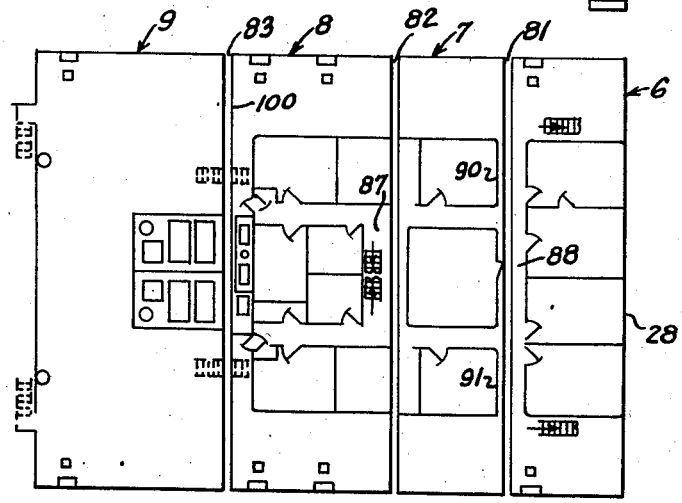
Fig. 16 is a similar view presenting similar features of the deck next below, that is, at the boat deck level, the deckhouse being in sections.
Figure 17:
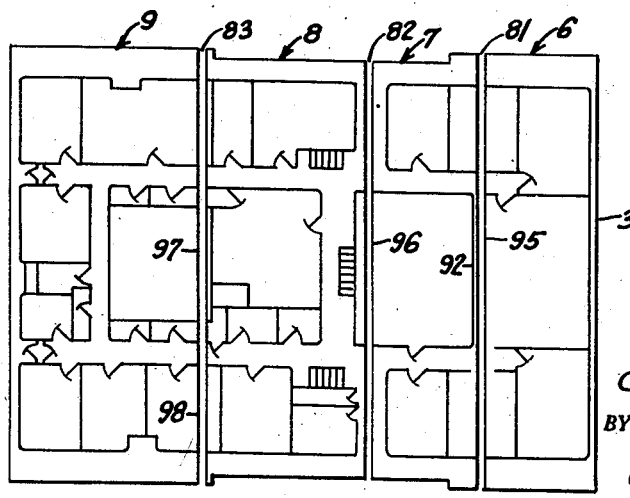
Fig. 17 is a similar view presenting similar features of the deck next below, that is, at the upper deck level, the deckhouse being in sections.

The plans of the various decks of the midships deckhouse appear on Figs. 15, 16 and 17, these figures showing the house with the sections 6, 7, 8 and 9 separated from each other. The lines of separation between adjacent sections are preferably straight at each deck, and preferably with the separation lines at the superimposed decks lying in a vertical plane. In other words, the lines of separation between the sections 6 and 7 are straight lines at each deck and superimposed over each other. The same is true of the sections 7 and 8, and of the sections 8 and 9. It thus appears as though the individual sections have been sliced off the complete deckhouse. This may not be essential, but it simplifies not only the production of the sections 6, 7, 8 and 9, but also their assembly into a unitary deckhouse.

The bridge deck 31 is over the boat deck 28 and forms the ceiling for the rooms and passageways therebetween. The boat deck is over the upper deck 3 and forms the ceiling for the rooms and passageways therebetween. The house top 34, appearing on Figs. 10, 13 and 14 is over the bridge deck 31 and forms the ceiling for the rooms and passageways therebetween. The deck plans for these three decks may be any desired. The division or separation lines 81, between the sections 6 and 7, are preferably in an upright plane at all points touched thereby. The same is true of the division or separation line 82, between the sections 7 and 8, and also of the division or separation line 83, between the sections 8 and 9. The locations of the division or separation lines will be determined primarily by the weights of the resulting sections, each of which, as already explained, must be below a certain maximum determined by the capacity of the lifting crane available.

It has been found advisable to locate the division or separation lines, where possible, through passageways, such, for example, as 85, 86, 87, 88 and so closely adjacent to any available bulkheads, such as 89, 90, 91, 92, and the like, that such bulkheads will maintain the structural strength of the section while the section is suspended without the least addition of temporary strengthening elements thereat. The additional strengthening means are to be used wherever the separation or division lines between the sections would cause sufficient weakening to result in permanent distortion or deformation or even in undesired stresses and strains, for example, at such locations as 95, 96, 97, 98, 99, 100, and the like.

The structure of the complete midships deckhouse may be considered as cellular with the cells arranged more or less irregularly at the same and at different levels. While this seems to complicate the determination of the most desirable locations of the division or separation lines between the individual sections, the rules given above simplify the apparent complexity.

After adjacent sections have been placed in proper position, they are welded to the ship or to the upper deck, and to each other. As the welding proceeds, the additional temporary strengthening means may be removed. The final product has the same structure and the same strength as if the whole were fabricated merely by adding one steel plate at a time.

Certain details have been referred to for the purpose of describing the invention, but some of them may be varied without departing from the spirit of the invention, the scope of which is defined in the appended claims.

What I claim is:

1. The method of constructing a deckhouse of steel plates by welding them together, which comprises welding steel bulkheads to a steel deck with said deck below said bulkheads, turning the resulting structure to place the deck above said bulkheads, and welding said bulkheads to a steel deck below said bulkheads.

2. The method of constructing a steel deckhouse having superimposed steel decks, and bulkheads therebetween, which comprises welding said bulkheads to the respective decks with said decks below the respective bulkheads, superimposing the resulting structures one over another, with the decks of the respective bulkheads thereabove, and welding said bulkheads onto the decks constituting the respective decks below them.

3. The method of shipbuilding which includes the following steps in fabricating a cellular structural unit of a ship embracing a lower deck portion, an upper deck portion and bulkheads connecting the two deck portions, viz.: laying out the upper deck portion in upside-down position, downhand welding the edges of the bulkhead portions, which edges will be in the finished structure at the top of the structure, to the inverted upper deck portion, righting the said upper deck portion and attached bulkheads, placing the bulkhead portions in position upon their corresponding lower deck portion, and downhand welding the bottom edges of said bulkhead portions to said lower deck portion.

4. In the method of building a steel ship, the steps which comprise the erection of a cellular ship structure having upper and lower deck portions and bulkheads and in which the bulkheads are first permanently united to the upper deck portion while the latter is in upside down position, then uprighting the parts so united to bring the upper deck portion uppermost, then positioning the so-united parts on the lower deck portion and permanently uniting the bulkheads to the lower deck portion.

5. In the method of shipbuilding which includes the prefabrication in sections of a cellular structural unit wherein each section of a unit embraces a lower deck portion, an upper deck portion and connecting bulkheads, including the following steps: first uniting the upper deck portion and its corresponding bulkheads by welding the bulkheads to the upper deck portion while the upper deck is in upside down position, then uprighting said united parts so welded with the bulkheads resting on said lower deck, and then welding the bulkheads to the lower deck.

CLAY P. BEDFORD.